US006865778B2

United States Patent
Pan et al.

(10) Patent No.: US 6,865,778 B2
(45) Date of Patent: Mar. 15, 2005

(54) HINGE MECHANISM

(75) Inventors: Long-Jyh Pan, Shijr (TW); Hsiao-Wu Chen, Pingjen (TW)

(73) Assignee: BenQ Corporation, Taoyuan Shien (TW)

( * ) Notice: Subject to any disclaimer, the term of this patent is extended or adjusted under 35 U.S.C. 154(b) by 16 days.

(21) Appl. No.: 10/361,833

(22) Filed: Feb. 11, 2003

(65) Prior Publication Data

US 2003/0163901 A1 Sep. 4, 2003

(30) Foreign Application Priority Data

Mar. 1, 2002 (TW) ........................... 91103877 A

(51) Int. Cl.[7] .............................................. E05D 11/08
(52) U.S. Cl. ............................ 16/342; 16/386; 16/330
(58) Field of Search ...................... 16/386, 330, 303, 16/304, 285, 328, 337, 341, 342, 344; 379/433, 428, 433.11–433.13; 403/83.84, 118–120

(56) References Cited

U.S. PATENT DOCUMENTS

| | | | | |
|---|---|---|---|---|
| 4,822,965 A | * | 4/1989 | Hyogo et al. ............... 200/333 |
| 5,628,089 A | * | 5/1997 | Wilcox et al. ................ 16/303 |
| 5,640,690 A | * | 6/1997 | Kudrna .................... 455/575.3 |
| 5,678,206 A | * | 10/1997 | Ishii ........................ 455/575.8 |
| 5,697,124 A | * | 12/1997 | Jung ............................. 16/341 |
| 5,704,094 A | * | 1/1998 | Hartigan et al. .............. 16/303 |
| 5,987,122 A | * | 11/1999 | Daffara et al. ......... 379/433.13 |
| 5,996,178 A | * | 12/1999 | Murray ......................... 16/303 |
| 6,122,801 A | * | 9/2000 | Reichert et al. .............. 16/284 |
| 6,256,481 B1 | | 7/2001 | Jeong et al. |
| 6,295,358 B1 | * | 9/2001 | Kubota .................. 379/433.13 |
| 6,678,539 B1 | * | 1/2004 | Lu .......................... 455/575.1 |

\* cited by examiner

*Primary Examiner*—Robert J. Sandy
*Assistant Examiner*—Andre' L. Jackson
(74) *Attorney, Agent, or Firm*—Rabin & Berdo, P.C.

(57) ABSTRACT

A hinge mechanism for pivotally connecting a flip onto a housing includes a bush, a spring, and a camshaft. The bush is connected to the flip and has a sidewall, a receiving space defined by the sidewall, and a protrusion. The protrusion is protruded from the sidewall. The camshaft has a first end, a second end, and a shaped notch. The shaped notch includes a first concave portion and a second concave portion, and the protrusion is slidably received within the shaped notch. The first end of the camshaft is slidably coupled to the bush, and the second end of the camshaft is restrictedly coupled to the housing. When the flip is pivoted on the housing, the bush simultaneously rotates around the pivoting axis of the hinge mechanism so that the protrusion slides within the shaped notch from the first concave portion to the second concave portion.

25 Claims, 7 Drawing Sheets

HINGE MECHANISM

This application claims the benefit of Taiwan application Ser. No. 091103877, filed Mar. 1, 2002.

BACKGROUND OF THE INVENTION

1. Field of the Invention

The invention relates in general to a hinge mechanism, and more particularly to a hinge mechanism operational with a relative motion between a bush and a camshaft.

2. Description of the Related Art

Cellular phones have come into general use with the close communication and the frequent need to exchange data and thus have become indispensable tools for modern people due to the features of compactness, portability, and convenience.

Referring to FIG. 1, an exploded view of a flip phone is shown. The flip phone 100 includes a housing 102 and a flip 104. The housing 102 includes a display section 103, an operation section 105, buttons 106, and a liquid crystal display (LCD) 108. The display section 103 is situated higher than the operation section 105. The buttons 106 are disposed on the operation section 105 and are used as the method of input. LCD 108 is positioned on the display section 103 and is used for display.

The flip 104 has a sleeve 110 connected with one end of the flip 104. The shafts 112a and 112b are disposed at two ends of the sleeve 110 respectively. The housing 102 has a sunken part 114, which includes two holes 116a and 116b for receiving two shafts 112a and 112b respectively at opposite sides of the sunken part 114. When assembling the flip 104 to the housing 102, the sleeve 110 is installed in the sunken part 114 along the direction of the arrow sign 150 in FIG. 1, and then the shafts 112a and 112b are installed in the respective holes 116a and 116b for the rotation of the flip 104.

In general, the sleeve 110, the shafts 112a and 112b, the sunken part 114, and the holes 116a and 116b are called a hinge mechanism, which pivots the flip 104 on the housing 102. Since the housing 102, the sunken part 114, and the holes 116a and 116b are formed as an unit and the flip 104, the sleeve 110, and the shafts 112a and 112b are also formed as an unit, it requires a strenuous effort to assemble and disassemble the flip phone 100. The sleeve 110 and the sunken part 114 are easily damaged in the attempt to separate the flip 104 from the housing 102 due to the tight configuration of the hinge mechanism, while the flip phone 100 requires repairing. Additionally, all components of the hinge mechanism would have to be discarded along with the damaged flip 104 and housing 102, which is a costly waste.

SUMMARY OF THE INVENTION

It is therefore an object of the invention to provide a hinge mechanism for easy assembly and disassembly. The hinge mechanism pivots a flip on a housing and prevents the flip and the housing from being damaged during the assembly or disassembly of the foldable device. The simple structure of the hinge mechanism can miniaturize its volume and reduce the manufacturing cost. In addition, it is easy to operate the flip due to the design of a relative motion between a bush and a camshaft.

The invention achieves the above-identified objects by providing a hinge mechanism, for pivotally connecting a flip onto a housing. The hinge mechanism includes a bush, a spring, and a camshaft, wherein the bush has a sidewall, a receiving space defined by the sidewall, and a protrusion. The protrusion is protruded from the sidewall, and the elastic means is disposed within the receiving space. The camshaft has a first end, a second end, and a shaped notch. The shaped notch includes a first concave portion and a second concave portion. The protrusion is slidably received within the shaped notch. The first end of the camshaft is slidably coupled to the bush, and the second end of the camshaft is restrictedly coupled to the housing, so that the camshaft is only slidable relative to the housing substantially along a pivoting axis of the hinge mechanism. When the flip is pivoted on the housing, the bush simultaneously rotates around the pivoting axis of the hinge mechanism so that the protrusion slides within the shaped notch from the first concave portion to the second concave portion.

The invention achieves the above-identified objects by providing another hinge mechanism applied to a foldable device, for pivotally connecting a flip onto a housing, including a bush, a spring, and a camshaft. The bush has a sidewall, a receiving space defined by the sidewall, and a protrusion. The protrusion is protruded from the sidewall. Besides, the elastic means is disposed within the receiving space. The camshaft has a first end, a second end, and a shaped notch. The shaped notch has a first concave portion, a second concave portion, and a convex portion. The convex portion is disposed between the first concave portion and the second concave portion. The protrusion is slidably received within the shaped notch, the first end of the camshaft is slidably coupled to the bush, and the second end of the camshaft is restrictedly coupled to the housing, so that the camshaft is only slidable relative to the housing substantially along a pivoting axis of the hinge mechanism. The flip is in an opened position while the protrusion is located at the first concave portion, the flip is in a half-opened position while the protrusion is located at the convex portion, and the flip is in a closed position while the protrusion is located at the second concave portion.

When the flip in the opened position or in the closed position shifts into the half-opened position, the protrusion moves from the first concave portion or the second concave portion to the convex portion to enable the camshaft to move toward the bottom of the bush and compress the spring. After the protrusion passes the convex portion, the elastic means pushes back the camshaft from the convex portion to the first or second concave portion so that the flip in the half-opened position shifts to be in the respective opened or closed position.

Other objects, features, and advantages of the invention will become apparent from the following detailed description of the preferred but non-limiting embodiments. The following description is made with reference to the accompanying drawings.

DETAILED DESCRIPTION OF THE INVENTION

The hinge mechanism according to the invention is applied to a foldable device, pivotally connecting the flip onto the housing and including a bush, a spring, and a camshaft. The bush has a receiving space, a protrusion, and a receiving space defined by the sidewall. The protrusion is protruded from the sidewall, and the spring is disposed within the receiving space. One end of the camshaft is received inside the receiving space so that the spring connects the camshaft and the bottom of the bush, and the other end of the camshaft is connected to the housing. The camshaft has a shaped notch in order to be coupled with the protrusion.

When the flip is pivotally connected onto the housing, the bush simultaneously rotates around the pivoting axis of the hinge mechanism so that the protrusion slides with the shaped notch from the first concave portion to the second concave portion. The foldable device can be a cellular phone or Personal Digital Assistant (PDA).

Figure 1:
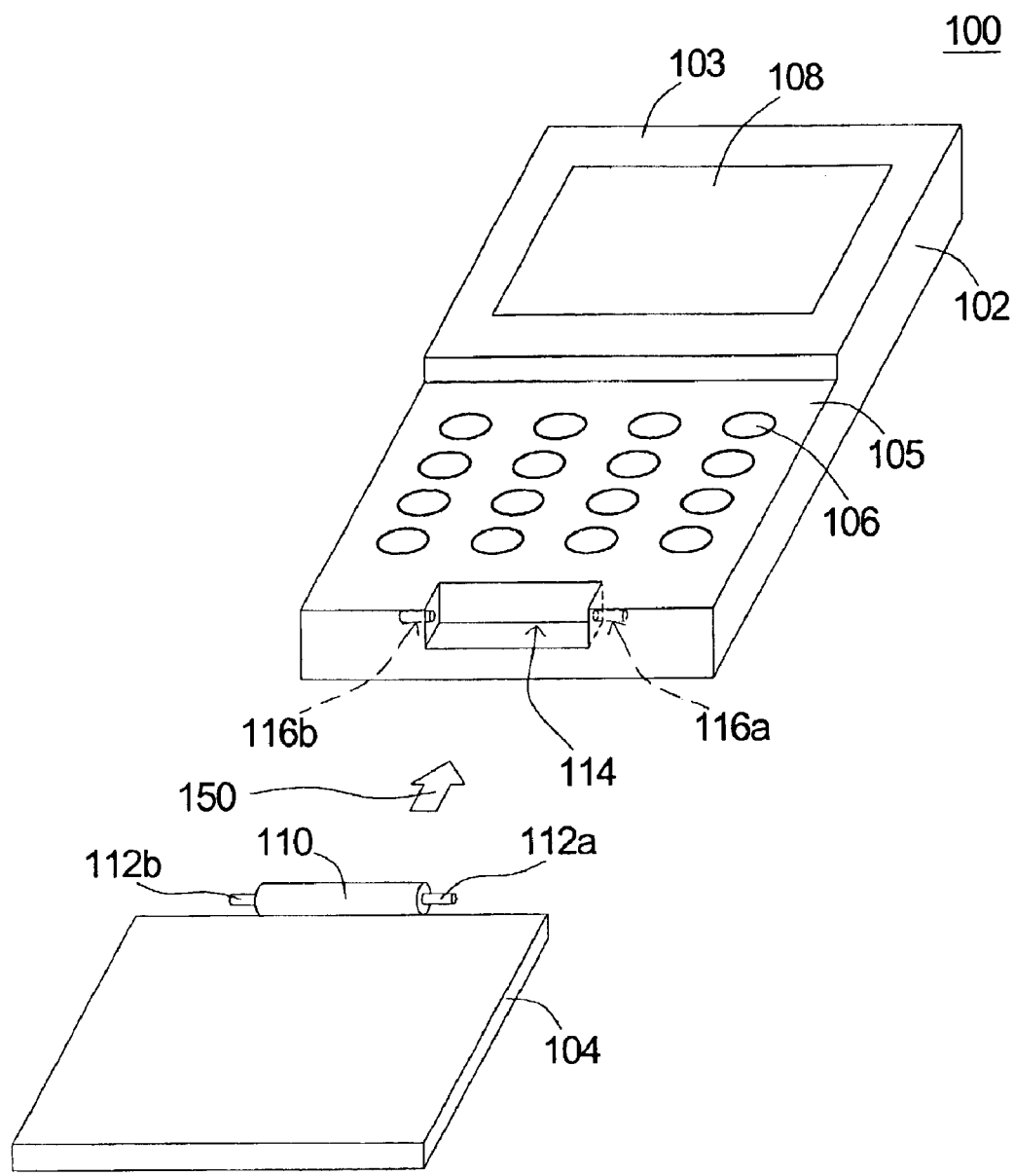
FIG. 1 (Prior Art) is an exploded view of a flip phone.
Figure 2A:
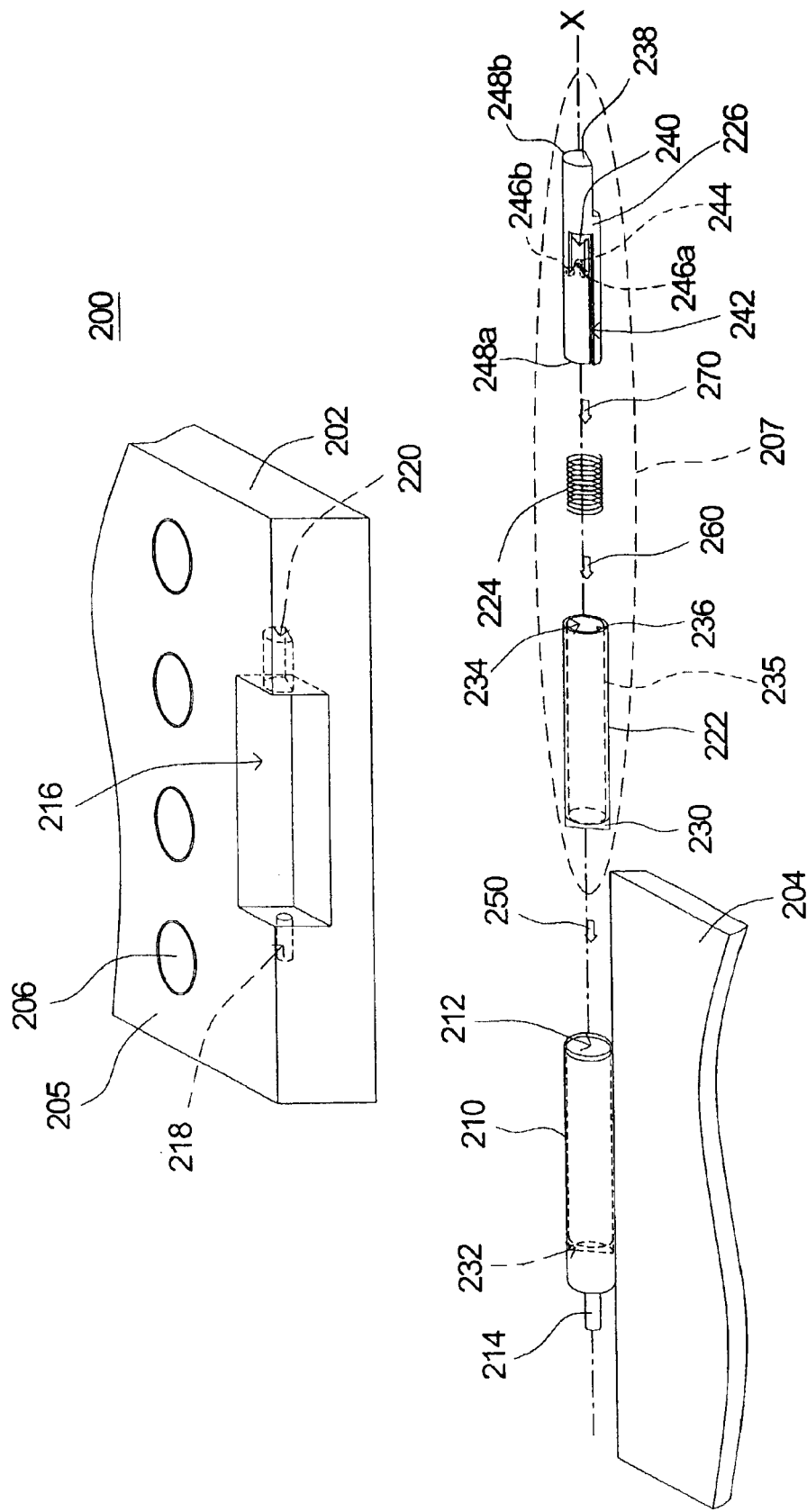
FIG. 2A shows an exploded view of a flip phone with a hinge mechanism according to the preferred embodiment of the invention.
Figure 2B:
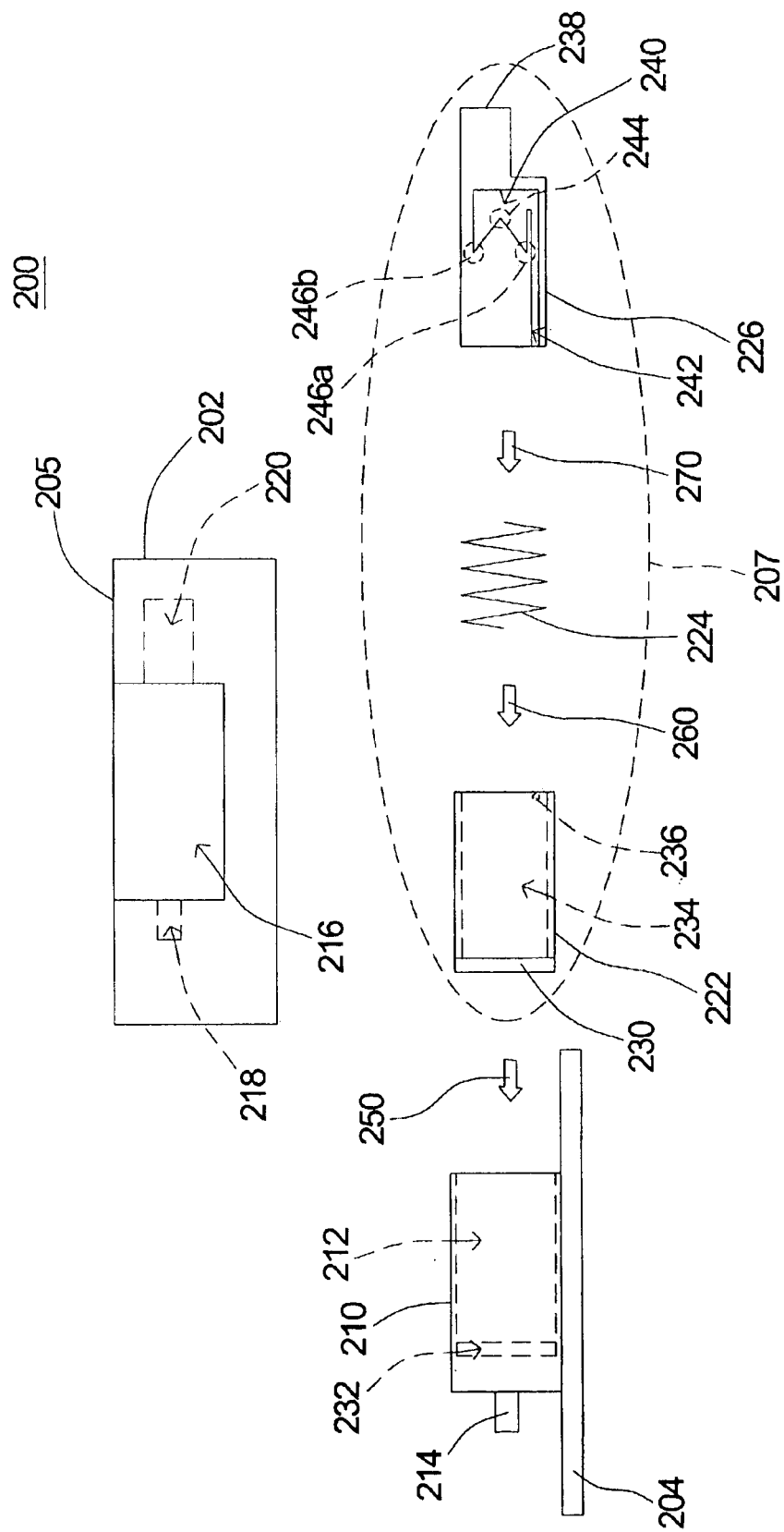
FIG. 2B is a lateral view of FIG. 2A.

Refer first to FIGS. 2A and 2B, which show an exploded view and a lateral view of a flip phone with a hinge mechanism according to the preferred embodiment of the invention. The flip phone 200 includes a housing 202, a flip 204, and a hinge mechanism 207. The hinge mechanism 207 pivotally connects the flip 204 onto the housing 202. The housing 202 includes an operation section 205 and buttons 206. When the flip 204 is in the closed position, the flip 204 is situated on the operation section 205. The buttons 206 are disposed on the operation section 205 and are used for input.

The flip 204 includes a sleeve 210, one end of which has a bush-receiving space 212 for receiving the bush, and the other end of which includes a shaft 214. The housing 202 has a sunken part 216 for receiving the sleeve 210. The sunken part 216 includes a rotation hole 218 for receiving the shaft 214 and a sliding hole 220 for receiving the camshaft 226 at opposite sides of the sunken part 216. The shaft 214 is received in the rotation hole 218 and rotates with the flip 204 simultaneously.

The hinge mechanism 207 includes a bush 222, a spring 224, and a camshaft 226. The bush 222 can be installed in the bush-receiving space 212 along the direction of the arrow sign 250. A first cut 232 on the bottom of the sleeve 210 and a second cut 230 of the bush 222 are used for jointing the sleeve 210 and the bush 222 so that the bush 222 is keyed to the flip and simultaneously rotates with the flip around the pivoting axis X of the hinge mechanism 207. The bush 222 has a sidewall 235, a receiving space 234 defined by the sidewall 235, and a protrusion 236. The protrusion 236 is protruded from the sidewall 235. Furthermore, the spring 224 is disposed within the receiving space 234 along the direction of the arrow sign 260.

The camshaft 226 has a first end 248a, a second end 248b, and a shaped notch 240 and an axial groove 242, which are connected to each other. The shaped notch 240 has a convex portion 244, a first concave portion 246a, and a second concave portion 246b, where the convex portion 244 is disposed between the first concave portion 246a and the second concave portion 246b. The protrusion 236 is slidably received within the shaped notch 240, the first end 248a of the camshaft 226 slidably coupled to the bush 222, and the second end 248b of the camshaft 226 is restrictedly coupled to the housing 202, so that the camshaft 226 is only slidable relative to the housing 202 substantially along a pivoting axis X of the hinge mechanism 207. The first end 248a of the camshaft 226 is received inside the receiving space 234 by insertion along the direction of the arrow sign 270 so that the spring 224 connects the camshaft 226 and the bottom of the bush 222, and the second end 248b of the camshaft is connected to the housing 202. The protrusion 236 moves from the axial groove 242 to the shaped notch 240 and then the camshaft 226 is coupled within the receiving space 234. In addition, the joint 238 of the camshaft 226 is axially received in the sliding hole 220. Consequently, the hinge mechanism 207 is able to connect the housing 202 and the flip 204.

When the hinge mechanism 207 is assembled on the flip 204, the bush 222 is first installed in the bush-receiving space 212 and the spring 224 and the camshaft 226 take turns to be installed in the receiving space 234 so that the spring 224 connects the camshaft 226 and a bottom of the bush 222. After that, the shaft 214 and the joint 238 are inserted into the rotation hole 218 and the sliding hole 220 respectively, and then the hinge mechanism 207 is able to pivotally connect the flip 204 onto the housing 202. On the other hand, the housing 202, the flip 204, and the hinge mechanism 207 can be dissembled in reverse order of the assembly process. It is therefore easy to assemble or disassemble the flip phone employing the hinge mechanism of the invention.

Figure 3C:
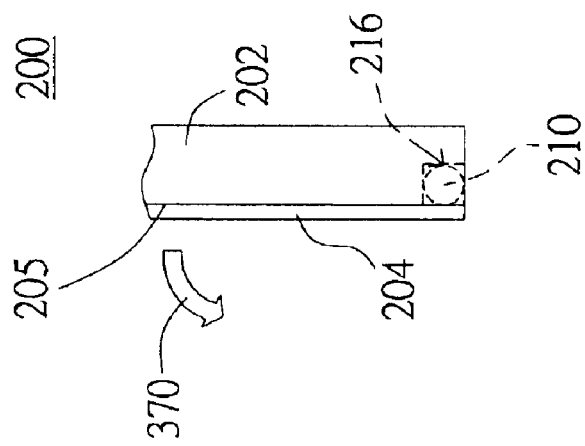
FIG. 3C shows a lateral view of the flip phone of FIG. 2A with the flip in the closed position.
Figure 3B:
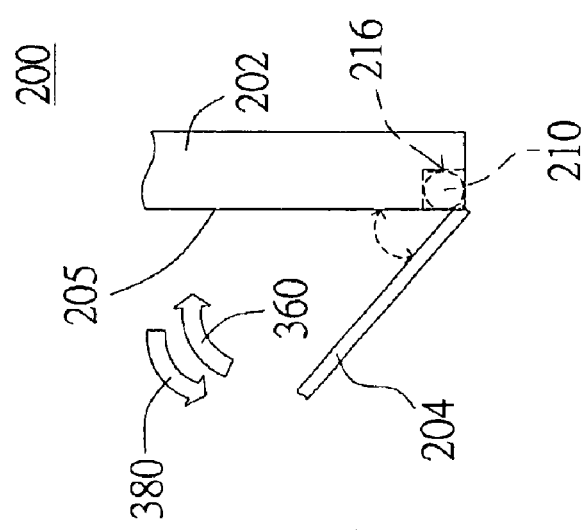
FIG. 3B shows a lateral view of the flip phone of FIG. 2A with the flip in the half-opened position.
Figure 3A:
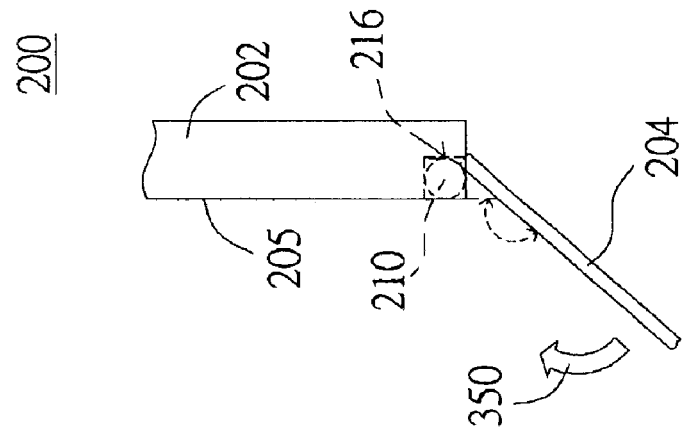
FIG. 3A shows a lateral view of the flip phone of FIG. 2A with the flip in the opened position.
Figure 4A:
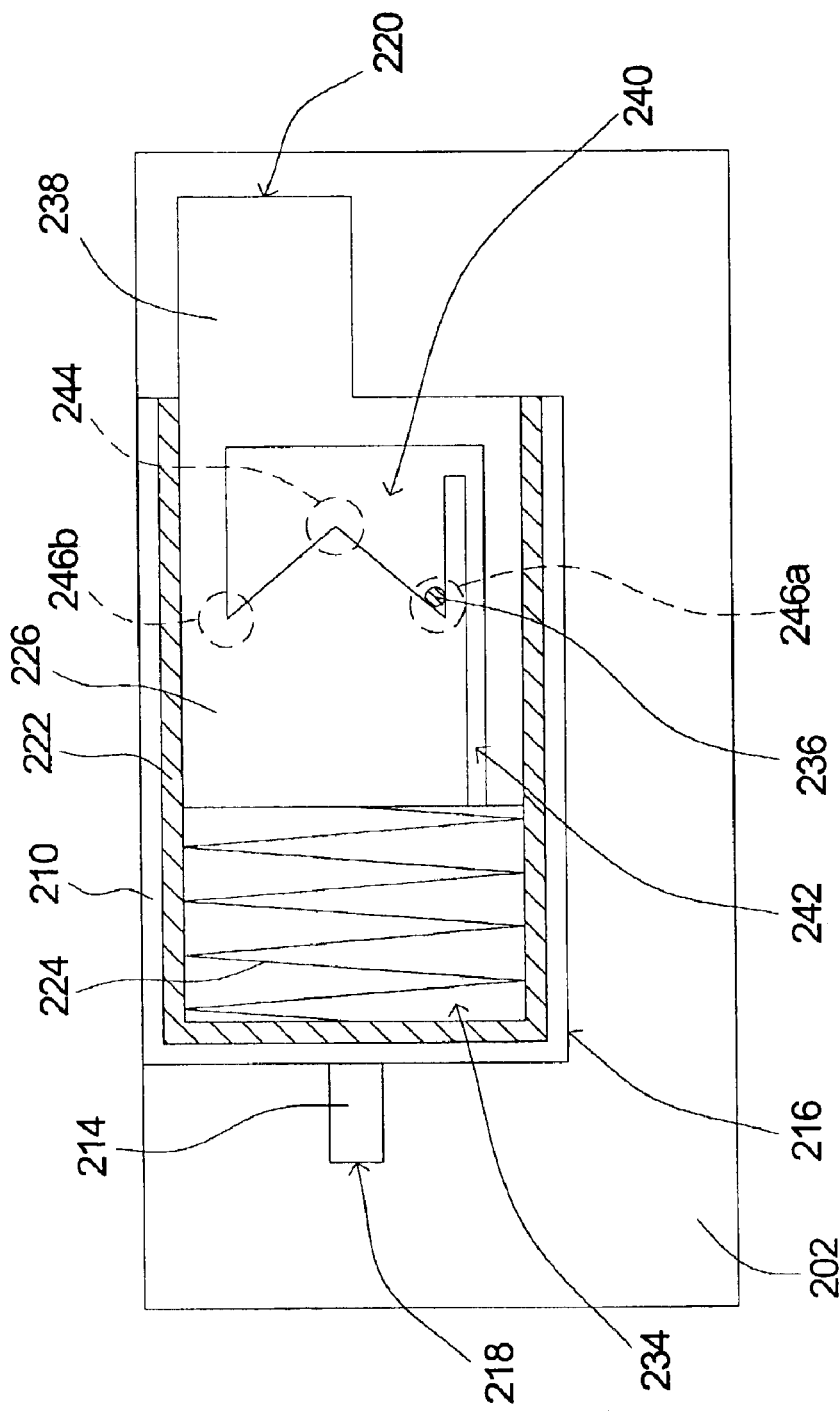
FIG. 4A shows the hinge mechanism of FIG. 3A.
Figure 4B:
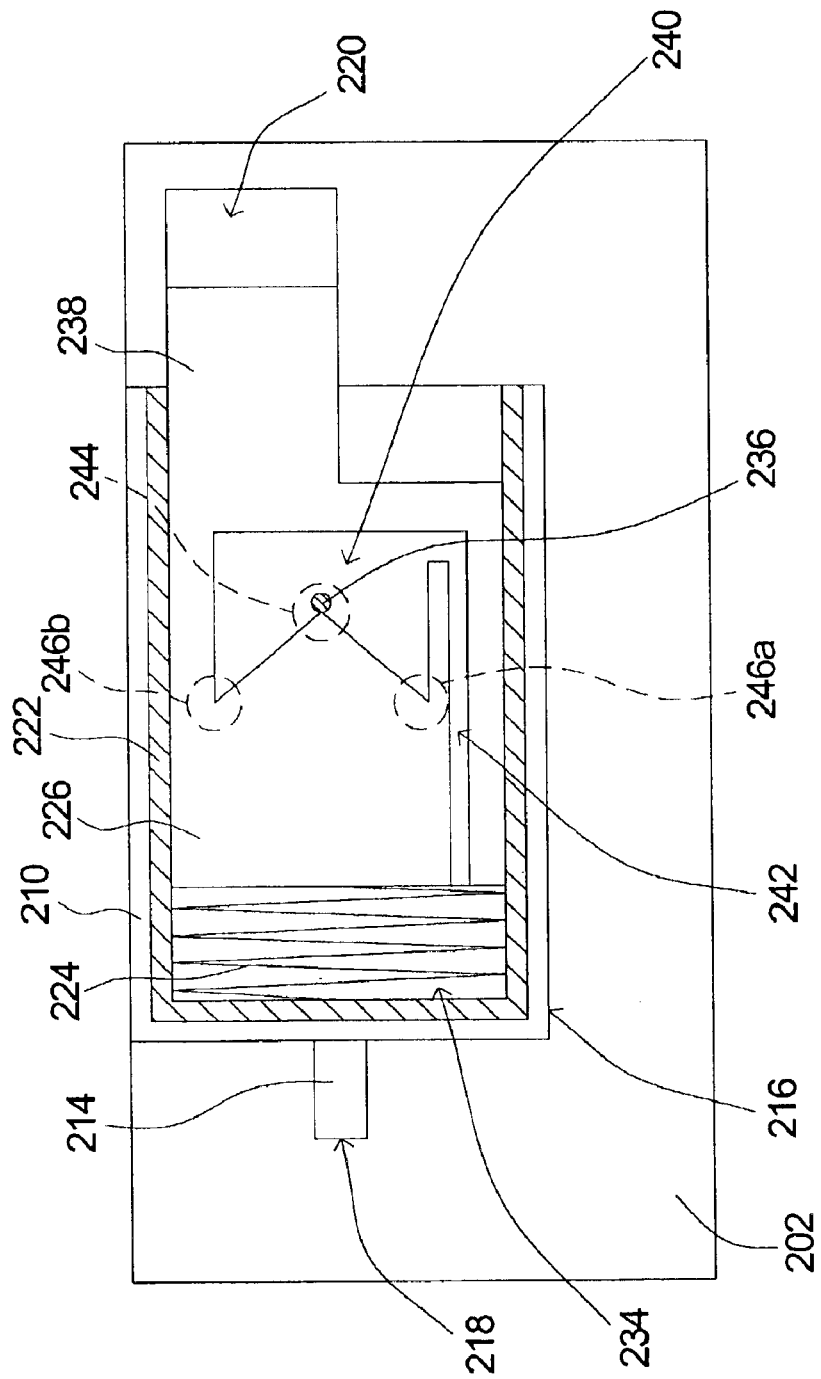
FIG. 4B shows the hinge mechanism of FIG. 3B.
Figure 4C:
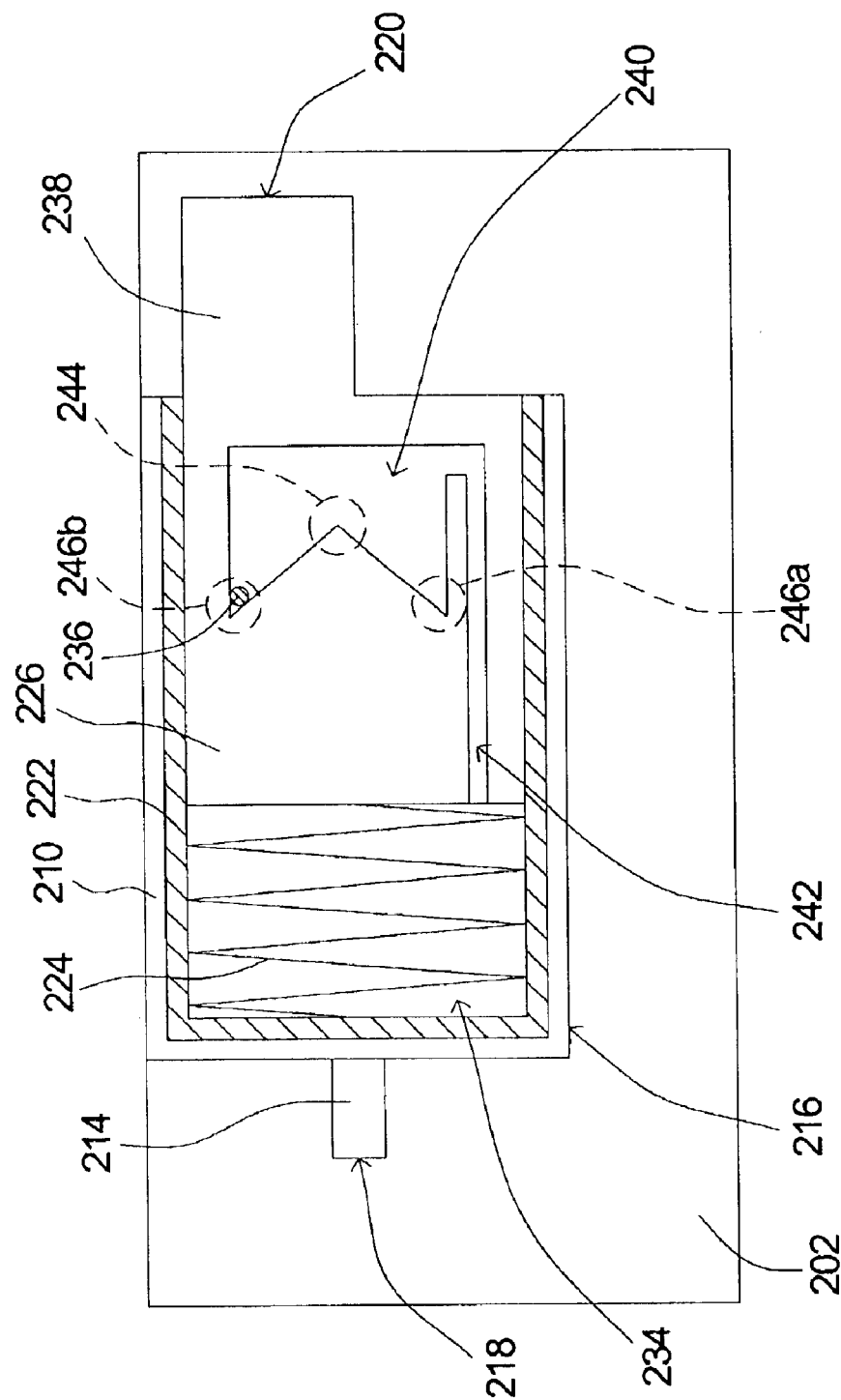
FIG. 4C shows the hinge mechanism of FIG. 3C.

Please refer to FIGS. 3A–3C and FIGS. 4A–4C for further description about the interaction among the relevant components while the flip is operated to be in different positions. FIGS. 3A–3C are lateral views of a flip phone with the flip respectively in the opened, half-opened, and close positions. FIGS. 4A–4C show the respective hinge mechanisms in FIGS. 3A–3C.

Referring to FIG. 4A, the protrusion 236 is located at the first concave portion 246a and the joint 238 is received inside the sliding hole 220, while the flip is in an opened position and forms an opening angle e with the housing 202 as shown in FIG. 3A. Also, the opening angle e is relative to a distance between the first concave portion 246a and the second concave portion 246b.

When the user turns the opened flip 204 for closing, the flip 204 pivotally rotates relative to the housing 202 along the direction of arrow sign 350 in FIG. 3A to be in a half-opened position, and the opening angle decreases from è to â. As shown in FIG. 4B, the protrusion 236 moves from the first concave portion 246a to the convex portion 244. When the flip 204 in the opened position shifts to be in the half-opened position, the bush 222 simultaneously rotates around the pivoting axis X of the hinge mechanism so that the protrusion 236 slides within the shaped notch 240 from the first concave portion 246a to the second concave portion 246b, and consequently the camshaft 226 moves toward the bottom of the bush 222 to compress the spring 224.

When the flip 204 proceeds to rotate relative to the housing 202 along the direction of the arrow sign 360 in FIG. 3B, the flip 204 in the half-opened position will shift to be in the closed position, as shown in FIG. 3C. After the protrusion 236 passes the convex portion 244, the spring 224 pushes back the camshaft 226b so that the joint 238 moves toward the sliding hole 220 and the protrusion 236 moves from the convex portion 244 to the second concave portion 246b.

When the user turns the closed flip 204 for opening, the flip 204 pivotally rotates relative to the housing 202 along the direction of arrow sign 370 in FIG. 3C to be in a half-opened position and forms an opening angle a as shown in FIG. 3B. When the flip 204 in the closed position shifts to be in the half-opened position, the protrusion 236 moves from the second concave portion 246b to the convex portion 244 and consequently the camshaft 226 moves toward the bottom of the bush 222 to compress the spring 224.

When the flip 204 proceeds to rotate relative to the housing 202 along the direction of the arrow sign 380 in FIG. 3B, the flip 204 in the half-opened position will shift to be in the opened position, as shown in FIG. 3A. After the protrusion 236 passes the convex portion 244, the spring 224 pushes back the camshaft 226b so that the joint 238 moves toward the sliding hole 220 and the protrusion 236 moves from the convex portion 244 to the first concave portion 246a.

The hinge mechanism according to the preferred embodiment of the invention has the following advantages:

1. Easy assembly and disassembly: the hinge mechanism used for pivotally connecting a flip onto a housing prevents the flip and the housing from being damaged during the assembly or disassembly of the flip phone.

2. Simple structure: the simple structure of the hinge mechanism can miniaturize its volume and reduce the manufacturing cost.

3. Easy operation: the design of a relative motion between a bush and a camshaft allows for easy operation of the flip.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge mechanism, for pivotally connecting a flip onto a housing, comprising:

a bush having a sidewall, a protrusion, and a receiving space defined by the sidewall, the protrusion being protruded from the sidewall;

a camshaft having a first end, a second end, and a shaped notch, the shaped notch having a first concave portion and a second concave portion, the protrusion slidably received within the shaped notch, the first end of the camshaft slidably coupled to the bush, and the second end of the camshaft restrictedly coupled to the housing, so that the camshaft is only slidable relative to the housing substantially along a pivoting axis of the hinge mechanism; and an elastic means disposed within the receiving space and pressed by the camshaft and the bush;

wherein when the flip is pivoted on the housing, the bush simultaneously rotates around the pivoting axis of the hinge mechanism so that the protrusion slides within the shaped notch from the first concave portion to the second concave portion.

2. The hinge mechanism according to claim 1, wherein the camshaft comprises an axial groove for being connected with the shaped notch so that the protrusion moves from the axial groove to the shaped notch.

3. The hinge mechanism according to claim 1, wherein the flip includes a sleeve, one end of which has a bush-receiving space for detachably receiving the bush therein, and another end of which includes a fixed shaft that is connectable to the housing.

4. The hinge mechanism according to claim 3, wherein the bush-receiving space has a first cut and the bush has a second cut for jointing the sleeve and the bush so that the bush synchronously rotates with the flip.

5. The hinge mechanism according to claim 3, wherein the housing has a sunken part for receiving the sleeve, and the sunken part includes a rotation hole for receiving the shaft and a sliding hole for receiving the camshaft at opposite sides of the sunken part.

6. The hinge mechanism according to claim 5, wherein the camshaft comprises a joint, which is movably received in the sliding hole.

7. The hinge mechanism according to claim 1, wherein the shaped notch further comprises a convex portion, and the convex portion is disposed between the first concave portion and the second concave portion.

8. The hinge mechanism according to claim 7, wherein the flip is in an opened position while the protrusion is located at the first concave portion, the flip is in a half-opened position while the protrusion is located at the convex portion, and the flip is in a closed position while the protrusion is located at the second concave portion.

9. The hinge mechanism according to claim 8, wherein when the flip in the opened position or in the closed position shifts to be in the half-opened position, the protrusion moves from the first concave portion or the second concave portion to the convex portion to enable the camshaft to move toward the bottom of the bush and compress the elastic means.

10. The hinge mechanism according to claim 9, wherein after the protrusion passes the convex portion, the elastic means pushes back the camshaft so that the protrusion moves from the convex portion to the first concave portion or the second concave portion the flip in the half-opened position shifts to be in the opened position or the closed position.

11. The hinge mechanism according to claim 8, wherein the flip in the opened position forms an opening angle with the housing and the opening angle is relative to a distance between the first concave portion and the second concave portion.

12. A foldable device, including a housing, a flip, and a hinge mechanism, wherein the hinge mechanism pivotally connects a flip onto a housing, the hinge mechanism comprising:

a bush, connected to the flip, having a sidewall, a protrusion, and a receiving space defined by the sidewall, the protrusion being protruded from the sidewall;

a camshaft having a first end, a second end, and a shaped notch, the shaped notch having a first concave portion, a second concave portion, and a convex portion, wherein the convex portion disposed between the first concave portion and the second concave portion, the protrusion slidably received within the shaped notch, the first end of the camshaft slidably coupled to the bush, and the second end of the camshaft restrictedly coupled to the housing, so that the camshaft is only slidable relative to the housing substantially along a pivoting axis of the hinge mechanism; and an elastic means disposed within the receiving space and pressed by the camshaft and the bush;

wherein the flip is in an opened position while the protrusion is located at the first concave portion, the flip is in a half-opened position while the protrusion is located at the convex portion, and the flip is in a closed position while the protrusion is located at the second concave portion;

wherein when the flip in the opened position or in the closed position shifts to be in the half-opened position, the protrusion moves respectively from the first concave portion or the second concave portion to the convex portion to enable the camshaft to move toward the bottom of the bush and compress the elastic means; wherein after the protrusion passes the convex portion, the elastic means pushes back the camshaft so that the protrusion moves from the convex portion to the first concave portion or the second concave portion the flip in the half-opened position shifts to be in the respective opened position or the closed position.

13. The foldable device according to claim 12, wherein the camshaft comprises an axial groove for being connected with the shaped notch so that the protrusion moves from the axial groove to the shaped notch.

14. The foldable device according to claim 12, wherein the foldable device is a cellular phone.

15. The foldable device according to claim 12, wherein the foldable device is a Personal Digital Assistant (PDA).

16. The foldable device according to claim 12, wherein the flip includes a sleeve, one end of which has a bush-receiving space for detachably receiving the bush therein, and another end of which includes a fixed shaft that is connectable to the housing.

17. The foldable device according to claim 16, wherein the bush-receiving space has a first cut and the bush has a second cut for jointing the sleeve and the bush so that the bush synchronously rotates with the flip.

18. The foldable device according to claim 16, wherein the housing has a sunken part for receiving the sleeve, and the sunken part includes a rotation hole for receiving the shaft and a sliding hole for receiving the camshaft at opposite sides of the sunken part.

19. The foldable device according to claim 18, wherein the camshaft comprises a joint, which is movably received in the sliding hole.

20. A hinge mechanism, for pivotally connecting a flip onto a housing, comprising:
   a bush, connected to the flip, having a sidewall, a protrusion, and a receiving space defined by the sidewall, the protrusion being protruded from the sidewall;
   a camshaft having a first end, a second end, and a shaped notch, the shaped notch having a first concave portion, a second concave portion, and a convex portion, wherein the convex portion disposed between the first concave portion and the second concave portion, the protrusion slidably received within the shaped notch, the first end of the camshaft slidably coupled to the bush, and the second end of the camshaft restrictedly coupled to the housing, so that the camshaft is only slidable relative to the housing substantially along a pivoting axis of the hinge mechanism; and
   an elastic means disposed within the receiving space and pressed by the camshaft and the bush;
   wherein the flip is in an opened position while the protrusion is located at the first concave portion, the flip is in a half-opened position while the protrusion is located at the convex portion, and the flip is in a closed position while the protrusion is located at the second concave portion;
   wherein when the flip in the opened position or in the closed position shifts to be in the half-opened position, the protrusion moves from the first concave portion or the second concave portion to the convex portion to enable the camshaft to move toward the bottom of the bush and compress the elastic means;
   wherein after the protrusion passes the convex portion, the elastic means pushes back the camshaft so that the protrusion moves from the convex portion to the first concave portion or the second concave portion the flip in the half-opened position shifts to be in the opened position or the closed position.

21. The hinge mechanism according to claim 20, wherein the flip includes a sleeve, one end of which has a bush-receiving space for detachably receiving the bush therein, and another end of which includes a fixed shaft that is connectable to the housing.

22. The hinge mechanism according to claim 21, wherein the bush-receiving space has a first cut and the bush has a second cut for jointing the sleeve and the bush so that the bush synchronously rotates with the flip.

23. The hinge mechanism according to claim 21, wherein the housing has a sunken part for receiving the sleeve, and the sunken part includes a rotation hole for receiving the shaft and a sliding hole for receiving the camshaft at opposite sides of the sunken part.

24. The hinge mechanism according to claim 23, wherein the camshaft comprises a joint, which is movably received in the sliding hole.

25. The hinge mechanism according to claim 21, wherein the camshaft comprises an axial groove for being connected with the shaped notch so that the protrusion moves from the axial groove to the shaped notch.

* * * * *